United States Patent
Watfa et al.

(10) Patent No.: US 12,335,853 B2
(45) Date of Patent: Jun. 17, 2025

(54) USE OF UE ROUTE SELECTION POLICY (URSP) FOR NETWORK SLICING

(71) Applicant: Samsung Electronics Co., Ltd., Suwon-si (KR)

(72) Inventors: Mahmoud Watfa, Staines (GB); Lalith Kumar, Bangalore (IN); Varini Gupta, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 553 days.

(21) Appl. No.: 17/673,564

(22) Filed: Feb. 16, 2022

(65) Prior Publication Data

US 2022/0272623 A1    Aug. 25, 2022

(30) Foreign Application Priority Data

Feb. 16, 2021   (IN) .............................. 202131006456
Feb. 15, 2022   (GB) ..................................... 2201976

(51) Int. Cl.
*H04W 48/18* (2009.01)
*H04W 60/04* (2009.01)
(Continued)

(52) U.S. Cl.
CPC ........... *H04W 48/18* (2013.01); *H04W 60/04* (2013.01); *H04W 76/10* (2018.02); *H04L 2101/375* (2022.05)

(58) Field of Classification Search
CPC ..... H04W 48/18; H04W 60/04; H04W 76/10; H04W 28/0865; H04W 60/00; H04W 76/00; H04W 40/24; H04L 2101/375
See application file for complete search history.

(56) References Cited

U.S. PATENT DOCUMENTS

2018/0332523 A1*  11/2018  Faccin ............... H04W 36/0033
2020/0053622 A1*   2/2020  Huang-Fu ............. H04W 76/20
(Continued)

FOREIGN PATENT DOCUMENTS

| KR | 10-2020-0118204 A | 10/2020 |
| WO | 2021019458 A1 | 2/2021 |
| WO | 2022/003570 A1 | 1/2022 |

OTHER PUBLICATIONS

International Search Report and Written Opinion of the International Searching Authority dated May 26, 2022, in connection with International Application No. PCT/KR2022/002305, 7 pages.

(Continued)

*Primary Examiner* — Sharmin Chowdhury

(57) ABSTRACT

The disclosure relates to a 5G or 6G communication system for supporting a higher data transmission rate. Disclosed is a method performed by a UE, the method comprising: having at least one existing PDU session associated with an S-NSSAI; requesting, from an upper layer, a new PDU session; determining a condition; performing checking operations comprising: (i) checking whether allowed NSSAI includes only one S-NSSAI, and (ii) checking whether any of the at least one existing PDU sessions have an attribute which matches a corresponding attribute in the requested new PDU session; and when both checking operations (i) and (ii) are true: selecting a PDU session from the at least one existing PDU sessions which matches at least one attribute, determining that the selected PDU session can be (Continued)

used or associated with the request from the upper layer, and forwarding details of the selected PDU session to the upper layer.

12 Claims, 4 Drawing Sheets

(51) Int. Cl.
  *H04W 76/10* (2018.01)
  *H04L 101/375* (2022.01)

(56) References Cited

U.S. PATENT DOCUMENTS

| | | | |
|---|---|---|---|
| 2020/0382605 | A1 | 12/2020 | Ouyang et al. |
| 2021/0058857 | A1 | 2/2021 | Huang-Fu |
| 2021/0243664 | A1 | 8/2021 | Huang-Fu et al. |
| 2021/0337456 | A1 | 10/2021 | Huang-Fu |
| 2022/0124595 | A1* | 4/2022 | Xu .............. H04W 40/248 |
| 2022/0272576 | A1 | 8/2022 | Huang-Fu |
| 2022/0312510 | A1* | 9/2022 | Keller ............. H04L 12/1407 |
| 2023/0239938 | A1* | 7/2023 | Hedman ............ H04W 8/205 370/329 |

OTHER PUBLICATIONS

3GPP TS 23.503 V16.7.0 (Dec. 2020), Technical Specification, 3rd Generation Partnership Project; Technical Specification Group Services and System Aspects; Policy and charging control framework for the 5G System (5GS); Stage 2 (Release 16), Dec. 2020, 114 pages.

China Mobile, "The suggestion of not emphasizing "the URSP handling layer"," C1-206132, 3GPP TSG-CT WG1 Meeting #126e, Electronic meeting, Oct. 15-23, 2020, 9 pages.

Motorola Mobility, et al., "Applicable URSP is not optional for a UE," C1-203868, 3GPP TSG-CT WG1 Meeting #124e, Electronic meeting, Jun. 2-10, 2020, 8 pages.

3GPP TS 24.301 V17.1.0 (Dec. 2020), Technical Specification, 3rd Generation Partnership Project; Technical Specification Group Core Network and Terminals; Non-Access-Stratum (NAS) protocol for Evolved Packet System (EPS); Stage 3 (Release 17), Dec. 2020, 587 pages.

3GPP TS 24.501 V17.1.0 (Dec. 2020), Technical Specification, 3rd Generation Partnership Project; Technical Specification Group Core Network and Terminals; Non-Access-Stratum (NAS) protocol for 5G System (5GS); Stage 3; (Release 17), Dec. 2020, 745 pages.

3GPP TS 24.526 V17.1.0 (Dec. 2020), Technical Specification, 3rd Generation Partnership Project; Technical Specification Group Core Network and Terminals; User Equipment (UE) policies for 5G System (5GS); Stage 3 (Release 17), Dec. 2020, 52 pages.

Combined Search and Examination Report under Sections 17 and 18(3) dated Jul. 20, 2022 in connection with United Kingdom patent application No. GB2201976.4, 5 pages.

Supplementary European Search Report dated Jun. 17, 2024, in connection with European Application No. 22756498.6, 11 pages.

Samsung, "Avoid unnecessary new PDU session with the same attributes," C1-210904, 3GPP TSG-CT WG1 Meeting #128-e, Electronic meeting, Feb. 25-Mar. 5, 2021, 6 pages.

* cited by examiner

USE OF UE ROUTE SELECTION POLICY (URSP) FOR NETWORK SLICING

CROSS-REFERENCE TO RELATED APPLICATIONS

This application is based on and claims priority under 35 U.S.C. 119 to Indian Patent Application No. 202131006456, filed on Feb. 16, 2021, in the Indian Intellectual Property Office, and United Kingdom Patent Application No. 2201976.4 filed on Feb. 15, 2022, in the U.K Patent Office, the disclosures of which are herein incorporated by reference in their entirety.

BACKGROUND

1. Field

The present application relates to a method to optimise the use of User Equipment, UE, Route Selection Policy (URSP) for Network Slicing.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

It is an aim of embodiments of the present application to address shortcomings in the prior art, whether mentioned herein or not.

According to the present application there is provided an apparatus and method as set forth in the appended claims. Other features of the application will be apparent from the dependent claims, and the description which follows.

According to a first aspect of the application, there is provided a method performed by a user equipment (UE), the method comprising: having at least one existing protocol data unit (PDU) session associated with a single network slice selection assistance information (S-NSSAI); requesting, from an upper layer, a new PDU session; determining a condition; perform checking operations comprising: (i) checking whether allowed network slice selection assistance information (NSSAI) includes only one S-NSSAI, and (ii) checking whether any of the at least one existing PDU sessions have an attribute which matches a corresponding attribute in the requested new PDU session; and when both checking operations (i) and (ii) are true: selecting a PDU session from the at least one existing PDU sessions which matches at least one attribute, determining that the selected PDU session can be used or associated with the request from the upper layer, and forwarding details of the selected PDU session to the upper layer.

In contrast to the prior art referred to previously, an embodiment of the present application effectively over-rides the determination to establish a new PDU session in the circumstance set out herein and, instead, uses an existing PDU session, in particular in the case where allowed NSSAI includes a single S-NSSAI.

In an embodiment, if the result of one of checking operations (i) and (ii) is false, then the UE sends a PDU establishment request message with an attribute that has been determined.

In an embodiment, the attribute that has been determined relates to S-NSSAI or DNN.

In an embodiment, the step of an upper layer in the UE requesting a new PDU session includes application information.

In an embodiment, the condition is verified on the basis of URSP rules and/or UE local configuration.

In an embodiment, the condition is at least one of: S-NSSAI is not known or not available; DNN is the same DNN as one of the at least one existing PDU sessions; and at least one of: SSC mode; IP version; preferred access type; and multi-access preference is the same as one of the at least one existing PDU sessions.

In an embodiment, for the at least one existing PDU session, the UE did not explicitly indicate S-NSSAI when requesting the at least one existing PDU session.

According to a second aspect of the present application, there is provided an apparatus arranged to perform the method of the first aspect.

Although a few preferred embodiments of the present application have been shown and described, it will be appreciated by those skilled in the art that various changes and modifications might be made without departing from the scope of the application, as defined in the appended claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a better understanding of the application, and to show how embodiments of the same may be carried into effect, reference will now be made, by way of example only, to the accompanying diagrammatic drawings in which.

DETAILED DESCRIPTION

Figure 1:
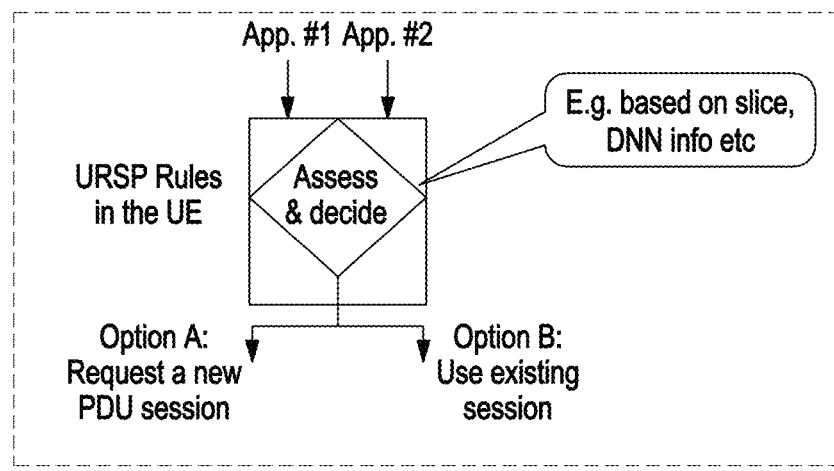
FIG. 1 shows a broad overview of the operation of an embodiment of the application.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The present application relates to a method to optimise the use of User Equipment, UE, Route Selection Policy (URSP) for Network Slicing. Network slicing is a process whereby network resources are made available in so-called slices. These slices can be configured to each have different configurations and/or properties, even if served from the same cell. Slicing allows network operators to provide highly customised, yet flexible options for users.

When the upper layers (e.g., an application) in the UE requests the use of a Protocol Data Unit, PDU, session, the Fifth Generation Session management, 5GSM, entity in the UE attempts to associate the application with a PDU session based on certain attributes. The PDU session may already exist or may need to be established. This determination of whether to establish a new PDU session or whether to use an existing PDU session, if any exists, depends on a match between the attributes of the URSP rules and the attributes of the existing PDU session, if any.

The following is specified in TS 24.501 V17.1.0:

"The URSP requires interaction between upper layers and the 5GSM entities in the UE (see 3GPP TS 24.526 for further details). Each of the 5GSM entities in the UE shall indicate attributes (e.g. PDU session identity, SSC mode, S-NSSAI, DNN, PDU session type, access type, PDU address) of a newly established PDU session to the upper layers. If a PDU session is released, the 5GSM entity handling the PDU session shall inform the PDU session identity of the released PDU session to the upper layers. The upper layers may request a 5GSM entity:

a) to establish a PDU session indicating one or more PDU session attributes;
b) to release an existing PDU session; or
c) to establish a PDU session indicating one or more PDU session attributes, and to release an existing PDU session."

The following is specified in TS 24.526 V17.1.0: "The URSP is defined in 3GPP TS 23.503 and is a set of one or more URSP rules, where a URSP rule is composed of:

a) a precedence value of the URSP rule identifying the precedence of the URSP rule among all the existing URSP rules;
b) a traffic descriptor, including either:
   1) match-all traffic descriptor; or
   2) at least one of the following components:
      A) one or more application identifiers;
      B) one or more IP 3 tuples as defined in 3GPP TS 23.503 i.e. the destination IP address, the destination port number, and the protocol in use above the IP;
      C) one or more non-IP descriptors, i.e. destination information of non-IP traffic;
      D) one or more DNNs;
      E) one or more connection capabilities; and
      F) one or more domain descriptors, i.e. destination FQDN(s) or a regular expression as a domain name matching criteria; and
c) one or more route selection descriptors each consisting of a precedence value of the route selection descriptor and either
   1) one PDU session type and, optionally, one or more of the followings:
      A) SSC mode;
      B) one or more S-NSSAIs;
      C) one or more DNNs;
      D) Void;
      E) preferred access type;
      F) multi-access preference;
      G) a time window; and
      H) location criteria; or
   2) non-seamless non-3GPP offload indication.

Only one URSP rule in the URSP can be a default URSP rule and the default URSP rule shall contain a match all traffic descriptor. If a default URSP rule and one or more non-default URSP rules are included in the URSP, any non-default URSP rule shall have lower precedence value than (i.e. shall be prioritised over) the default URSP rule. If a traffic descriptor lists one or more application identifiers together with one or more connection capabilities, the UE shall consider that the application identifiers identify the applications requesting access to the connection capabilities.

NOTE 1: The connection capabilities requested by the applications are OS dependent. The connection capability identifiers defined in table 5.2.1 are OS independent. It is based on the UE implementation how the UE matches the connection capabilities requested by the applications to the connection capability identifiers in table 5.2.1.

NOTE 2: If the UE has multiple concurrently active OS, the traffic descriptor can list as many multiple OS Ids.

If one or more DNNs are included in the traffic descriptor of a URSP rule, the route selection descriptor of the URSP rule shall not include any DNN.

NOTE 3: It is recommended to avoid the combination of more than two components in the traffic descriptor."

When the UE gets a new request to establish a PDU session, the UE verifies the attributes of the request e.g., application ID, etc, and checks for a match with a URSP rule. As can be seen, the URSP rule can be non-default URSP rule or a default URSP rule. There is at most one default URSP rule and it has the highest precedence value i.e. lowest priority. For a given URSP rule, the UE checks for a match with the traffic descriptor, and if so (i.e. if there is a match), then further verify the route selection descriptor (RSD) of the URSP rule for which there was a match with the traffic descriptor. If there is a match with the RSD (except for some attributes), the UE can use the existing PDU session for the requesting application. Otherwise, the UE continues to verify other RSDs within the current URSP rule if any. If no other RSD is available, the UE moves on to the next URSP rule, and so on.

Finally, if none of the non-default URSP rules have a traffic descriptor that matches, then the UE can consider the default URSP rule and make the determination accordingly.

The details of how the URSP rules can be used to associate an application to a PDU session are shown below from TS 24.526 V17.1:

"In order to send a PDU of an application, the upper layers require information on the PDU session (e.g. PDU address) via which to send a PDU of an application.

NOTE 0: If PAP/CHAP is used, it is recommended that the request from the upper layers includes a DNN.

When the upper layers request information of the PDU session via which to send a PDU of an application, information on the non-3GPP access outside of a PDU session shall be provided to the upper layers, without evaluating the URSP rules, if due to UE local configuration non-seamless non-3GPP offload is requested. Otherwise, the UE shall proceed in the following order:

a) the UE shall evaluate the URSP rules, except the default URSP rule, with a traffic descriptor matching the application information in increasing order of their precedence values, if any. If the traffic descriptor contains more than one traffic descriptor component type, each of a different type, all of them shall be matched. If the traffic descriptor contains more than one traffic descriptor component of the same traffic descriptor component type, at least one of the traffic descriptor components of the same traffic descriptor component type shall be matched with the application information. A URSP rule is determined not to be applicable when for any given component in the traffic descriptor no corresponding information from the application is available or the corresponding information from the application does not match any of the values in the traffic descriptor component as specified in subclause 6.6.2.1 of 3GPP TS 23.503. If the UE finds the traffic descriptor in a non-default URSP rule matching the application information, and:

I) if there is one or more PDU sessions:
  1) matching at least one of the route selection descriptors of the URSP rule except the preferred access type and the multi-access preference, if any, wherein a route selection descriptor with PDU session type IPv4v6 matches also with PDU session type IPv4 if the network has sent 5GSM cause value #50 "PDU session type IPv4 only allowed" in the PDU SESSION ESTABLISHMENT ACCEPT message, and a route selection descriptor with PDU session type IPv4v6 matches also with PDU session type IPv6 if the network has sent 5GSM cause value #51 "PDU session type IPv6 only allowed" in the PDU SESSION ESTABLISHMENT ACCEPT message; and
  2) established without requesting any parameter for which the matching route selection descriptor of the URSP rule does not provide a route selection descriptor component, except:
    i) the preferred access type;
    ii) the multi-access preference; and
    iii) the DNN, if one or more DNNs are included in the traffic descriptor, and the DNN provided by the application is the same as the DNN requested by the UE during the PDU session establishment.
  the UE shall provide information on the PDU session that matches the route selection descriptor of the lowest precedence value to the upper layers;

NOTE 1: It is up to the UE implementation which PDU session to select if there exist multiple PDU sessions matching the same route selection descriptor of the lowest precedence value.

II) otherwise:
  1) the UE shall select a route selection descriptor with the next smallest precedence value which has not yet been evaluated;
  2) if:
    i) the selected route selection descriptor contains a non-seamless non-3GPP offload indication:
      A) if the information on the non-3GPP access outside of a PDU session is available, it shall be provided to the upper layers and the UE shall stop selecting a route selection descriptor matching the application information.
      B) if the information about the non-3GPP access outside of a PDU session is not available, or non-3GPP access is not available the UE shall proceed to step 4);
    ii) the selected route selection descriptor includes a PDU session type or an SSC mode which is not supported by the UE, the UE shall proceed to step 4);
    iii) the selected route selection descriptor contains a time window but the time does not match the time window, the UE shall proceed to step 4);
    iv) the selected route selection descriptor contains location criteria but the UE location does not match the location criteria, the UE shall proceed to step 4);
    v) the selected route selection descriptor includes the multi-access preference but the UE does not support ATSSS, the UE shall proceed to step 4);
    va) the selected route selection descriptor includes an SSC mode which either has been rejected by the network with 5GSM cause value #68 "not supported SSC mode" for the same DNN (or no DNN, if no DNN was indicated by the UE) and the same S-NSSAI associated with (if available in roaming scenarios) a mapped S-NSSAI (or no S-NSSAI, if no S-NSSAI was indicated by the UE) or was not included in the Allowed SSC mode IE following a rejection with 5GSM cause value #68 "not supported SSC mode" for the same DNN (or no DNN, if no DNN was indicated by the UE) and the same S-NSSAI associated with (if available in roaming scenarios) a mapped S-NSSAI (or no S-NSSAI, if no S-NSSAI was indicated by the UE), the UE shall proceed to step 4); or
    vi) the selected route selection descriptor does not contain a non-seamless non-3GPP offload indication, the URSP handling layer requests the UE Non-access stratum, NAS, layer to establish a PDU session providing the following PDU session attributes based on the selected route selection descriptor:
      A) SSC mode if there is a SSC mode in the route selection descriptor;

NOTE 2: The SSC mode 3 is only used when the PDU session type is IPv4, IPv6 or IPv4v6.
      B) one S-NSSAI if the S-NSSAI is in the route selection descriptor; and the S-NSSAI is in the allowed NSSAI. If none of the S-NSSAI(s) in the route selection descriptor is in the allowed NSSAI, the UE shall proceed to step 4);

NOTE 3: If there are multiple S-NSSAIs in the route selection descriptor, an S-NSSAI is chosen among the S-NSSAIs based on UE implementation.
      C) one DNN, if the DNN is in the route selection descriptor and there is no DNN in the matched traffic descriptor; and if the DNN is an LADN DNN and the UE is in the service area of that LADN;

NOTE 4: If one or more DNNs are included in the traffic descriptor of a URSP rule and one or more DNNs are included in the route selection descriptor, the route selection descriptor is ignored and the UE proceeds to step 4). If one or more DNNs are included in the traffic descriptor and no DNN is included in the route selection descriptor, the DNN provided by the application is selected as one of the PDU session attributes by the URSP handling layer to request the UE NAS layer.

NOTE 5: If there is no DNN in the traffic descriptor and there are multiple DNNs in the route selection descriptor, a DNN is chosen based on UE implementation.
      D) the PDU session type of the route selection descriptor;
      E) preferred access type or multi-access preference, if the preferred access type or the multi-access preference is in the route selection descriptor; and NOTE 6: If a preferred access type or a multi-access preference is included in the traffic descriptor of a URSP rule, it is recommended that the UE establishes a PDU session based on the preferred access type or the multi-access preference.

The UE NAS layer indicates the result of the PDU session establishment. Upon successful completion of the PDU session establishment, the UE NAS layer shall additionally indicate the attributes of the established PDU session (e.g. PDU session identity, SSC mode, S-NSSAI, DNN, PDU session type, access type, PDU address) to the URSP handling layer, and shall provide information (e.g. PDU address) of the successfully established PDU session to the upper layers. The UE shall stop selecting a route selection descriptor matching the application information. If the PDU session establishment is unsuccessful, the UE shall proceed to step 3);

3) Based on the rejection cause and if there is another value which can be used for the rejected component in the same route selection descriptor, the UE shall select another combination of values in the currently selected route selection descriptor by using this value of the rejected component and proceed to step 2), otherwise the UE shall proceed to step 4); and 4) if there is any route selection descriptor which has not yet been evaluated, the UE shall proceed to step 1). If all route selection descriptors for the matching non-default URSP rule have been evaluated and there is one or more non-default matching URSP rule which has not yet been evaluated, the UE shall proceed to step a). If all non-default matching URSP rules have been evaluated, the UE shall inform the upper layers of the failure.

b) if no non-default matching URSP rule can be found and if UE local configuration for the application is available, the UE shall perform the association of the application to a PDU session accordingly. If no matching PDU session exists, the UE NAS layer shall attempt to establish a PDU session using UE local configuration.

NOTE 7: Any missing information in the UE local configuration needed to build the PDU session establishment request can be the appropriate corresponding component from the default URSP rule with the "match-all" traffic descriptor.

NOTE 8: If a DNN was provided by the application, the DNN provided by the application is selected as one of the PDU session attributes by the URSP handling layer to request the UE NAS layer.

If the PDU session establishment is successful, the UE NAS layer shall provide information (e.g. PDU address) of the successfully established PDU session to the upper layers. Otherwise, the UE shall go to step c);

c) if no non-default matching URSP rule can be found and if either UE local configuration for the application is not available or the PDU session establishment based on UE local configuration for the application was unsuccessful, the UE shall perform the association of the application to a PDU session or to non-seamless non-3GPP offload according to the default URSP rule with the "match-all" traffic descriptor, if any. If the association is unsuccessful, the UE shall inform the upper layers of the failure.

NOTE 9: If a DNN was provided by the application, the DNN provided by the application is selected as one of the PDU session attributes by the URSP handling layer to request the UE NAS layer. If one or more DNNs are included in the route selection descriptor of the default URSP rule and no DNN is provided by the application, the DNN in the route selection descriptor is selected as one of the PDU session attributes by the URSP handling layer to request the UE NAS layer. When there are multiple DNNs in the route selection descriptor, the DNN is selected based on UE implementation."

As can be seen from the above, a Route Selection Descriptor, RSD, component such as an S-NSSAI may not be present in the matching URSP rule. This component or other components are not necessarily present and hence are optional. Also from a Non-access stratum, NAS, protocol point of view, the request to establish a PDU session (which is sent in an UL NAS TRANSPORT) may not be sent with an associated S-NSSAI. The UL NAS TRANSPORT message actually lists the S-NSSAI Information Element, IE, as an optional IE. The request to establish a PDU session without any associated S-NSSAI can occur, for example, when a matching RSD has no S-NSSAI component, or when a default URSP rule with the match-all traffic descriptor is considered to be a matching URSP rule and that rule does not have an S-NSSAI. Note that these cases may not be the only cases that result in a request to establish a PDU session without an associated S-NSSAI IE.

When the UE sends a request to establish a PDU session but does not include an S-NSSAI, then the AMF will select an S-NSSAI for the UE. The selection of the S-NSSAI is described in TS 24.501 V17.1.0 as follows:

"iii) if the AMF does not have a PDU session routing context for the PDU session ID and the UE, and the Request type IE is included and is set to "initial request" or "MA PDU request":

A) the AMF shall select an SMF with following handlings:

If the S-NSSAI IE is not included and the allowed NSSAI contains:

one S-NSSAI, the AMF shall use the S-NSSAI in the allowed NSSAI as the S-NSSAI;

two or more S-NSSAIs and the user's subscription context obtained from UDM contains only one default S-NSSAI that is included in the allowed NSSAI, the AMF shall use the S-NSSAI in the allowed NSSAI that matches the default S-NSSAI as the S-NSSAI; or two or more S-NSSAIs and the user's subscription context obtained from UDM contains zero, two or more default S-NSSAI(s) included in the allowed NSSAI, the AMF shall use an S-NSSAI in the allowed NSSAI selected based on operator policy as the S-NSSAI.

If the DNN IE is included, the AMF shall use the UE requested DNN as the DNN determined by the AMF; and If the DNN IE is not included, and the user's subscription context obtained from UDM:

contains the default DNN for the S-NSSAI, the AMF shall use the default DNN as the DNN determined by the AMF; and does not contain the default DNN for the S-NSSAI, the AMF shall use a locally configured DNN as the DNN determined by the AMF; and"

It should be noted, from the above, that the selection of an S-NSSAI is based on the number of entries in the allowed NSSAI. In particular, when there is only one S-NSSAI in the allowed NSSAI, the AMF will always select that S-NSSAI.

Focusing on the case of a single S-NSSAI in the allowed NSSAI, e.g., S-NSSAI X is the only entry that is in the allowed NSSAI, the above means that if the UE, after going through its URSP rules, determines to send a request for a new PDU session without including the S-NSSAI IE (in the UL NAS TRANSPORT message), then the AMF will nevertheless select S-NSSAI X, which is the only slice that is allowed for the UE, in this example.

It should also be noted that when an application requests to use a session with particular attributes and there exists a PDU session with the same attributes, then the UE will not request a new PDU session just because the request is from a new application.

For example, assume an application, e.g., App #1, requests a session with:
IPv6 address
DNN A
S-NSSAI X If no session exists with these attributes, then the UE will request a new PDU session and provide these attributes if they match with the UE's URSP rules.

Now assume another application, App #2, requires a connection with the same attributes that are listed above. In this case, the UE will not request a new PDU session but rather will use the existing PDU session to send and/or receive data for App #2. However, if the DNN that the App #2 requested is different (e.g., DNN B) to the DNN of the existing PDU session (i.e., DNN A), then the UE will have to request a new PDU session and provide the DNN B.

There are various problems associated with the prior art including issues with selecting a Session Management Function, SMF, in the case of one S-NSSAI in the allowed NSSAI during subsequent PDU session establishment requests.

To illustrate the problem, consider the following scenario in which it is assumed that the UE in question is registered but it has only one S-NSSAI in the allowed NSSAI. Assume that this S-NSSAI is S-NSSAI X for the sake of an example.

Further, assume that the UE, based on a first request from an application, e.g., App #1, has actually requested the establishment of a PDU session with at least the following attributes:
DNN A
S-NSSAI X Note that it is assumed that the UE actually requested, or provided, the DNN (e.g., DNN A) or at least the S-NSSAI (e.g., S-NSSAI X) along with the request for a new PDU session.

Thus far, in this example, the UE is assumed to have a PDU with DNN A and S-NSSAI X, where the UE has at least requested (or explicitly provided) S-NSSAI X during the request for PDU session establishment and may have also provided a DNN such as DNN A.

At a later time, the UE's upper layers request the use of a session, where this request may come from another application e.g., App #2. Furthermore, assume that based on the traffic information and the URSP rules, the UE determines that no S-NSSAI can be requested for this application. For example, assume:
No S-NSSAI was received from the application, and/or
the UE's URSP rules declared a match based on the contents of the default URSP rule which, for the sake of an example, did not contain an S-NSSAI.

Since the matching URSP rule does not have an S-NSSAI component, which therefore obviously means that the lacking S-NSSAI is not the same as the S-NSSAI X of the existing PDU session, then the UE will have to establish a new PDU session with no S-NSSAI.

Continuing with the above scenario, the UE will send a PDU Session Establishment Request message but no associated S-NSSAI. It is also assumed that the DNN for the new session can be the same as the DNN of the existing session.

When the AMF receives the UL NAS TRANSPORT with the PDU Session Establishment Request message and no S-NSSAI, then according to the prior art, the AMF will select an S-NSSAI that is in the allowed NSSAI. In this example, since the UE only has one S-NSSAI in the allowed NSSAI, e.g., S-NSSAI X, then the AMF will select S-NSSAI X for the new request.

Furthermore, assuming the DNN is the same as the DNN of the existing PDU session, e.g., DNN A, then the attributes of the new PDU session request is DNN A and S-NSSAI X, where the latter is selected by the AMF. The outcome is therefore a new PDU session establishment request with exactly the same attributes as the existing PDU session. This is normally not allowed and not granted since there is no technical reason to actually establish a new PDU session whose attributes are exactly the same as an existing PDU session.

In fact, the network behaviour is not known in this case and if not specified then the problem can persist as the UE may keep retrying without changing anything.

Note that the problem can also occur when the UE has more than one S-NSSAI in the allowed NSSAI. For example, assume the UE has two S-NSSAIs in the allowed NSSAI as follows: S-NSSAI X and S-NSSAI Y. Further assume that S-NSSAI X is a default slice, but the UE is not aware of the fact that it is a default slice, and S-NSSAI Y is not the default slice. In other words, the UE's allowed NSSAI contains only one default S-NSSAI, in this example it is S-NSSAI X.

The UE may establish a first PDU session wherein the UE explicitly requests or includes the S-NSSAI X i.e., the UE includes the S-NSSAI IE in the UL NAS TRANSPORT and its value is an S-NSSAI that is a default S-NSSAI. At a later stage, the UE requests another PDU session to be established but does not include an S-NSSAI with the request. According to the current specification description in TS 24.501 V17.1.0, the AMF will select the default slice as can be seen from TS 24.501 V17.1.0:

"two or more S-NSSAIs and the user's subscription context obtained from UDM contains only one default S-NSSAI that is included in the allowed NSSAI, the AMF shall use the S-NSSAI in the allowed NSSAI that matches the default S-NSSAI as the S-NSSAI"

To this end, a mechanism is needed to avoid scenarios in which the UE may request to use an unidentified slice, which may not be granted, leading to cases of unpredictable outcomes, unnecessary signalling, and delays to the user experience, since the application in question may not have a session to run on or at least may be delayed.

A further problem with the prior art relates to a lack of allowed slices, which leads to impacting Evolved Packet System, EPS, parameters, although EPS does not support slicing The UE may not always send a requested NSSAI as described in TS 24.501 V17.1.0. When this happens, the network attempts to use one or more default slices for the UE. The UE may or may not support network slice-specific authentication and authorization. Regardless, if the network cannot find default slices for the UE, the network will reject the UE but will not use 5GMM cause #62 as specified in section A.3 of TS 24.501 V17.1.0:

"Cause #62— No network slices available

This 5GMM cause is sent by the network if none of the requested network slice(s) in the registration request are allowed and there are no default network slice(s) configured in the network.

NOTE: Network does not send this cause in REGISTRATION REJECT message if the UE does not include a requested NSSAI in the REGISTRATION REQUEST message. In that case, the Network uses other causes (e.g., #11, #13, #15) etc based on the subscription."

As can be seen, it is recommended to use other causes e.g., #11 (PLMN not allowed), #13 (Roaming not allowed in this tracking area), or #15 (No suitable cells in tracking area) in the case when the UE is rejected due to no available allowed NSSAI and the UE did not send a requested NSSAI.

Looking at the UE behaviour when some of these causes are received i.e., #11, #13, or #15, it can be seen that these causes will affect EPS parameters.

For example, the following is specified for the case when cause #13 is received by the UE:

"If the message was received via 3GPP access and the UE is operating in single-registration mode, the UE shall handle the EMM parameters EMM state, EPS update status, 4G-GUTI, last visited registered TAI, TAI list, eKSI and attach attempt counter as specified in 3GPP TS 24.301 for the case when the EPS attach request procedure is rejected with the EMM cause with the same value."

As can be seen, the UE's EPS parameters will be affected according to TS 24.301 where the following is specified when the same cause code i.e., #13 is received:

"The UE shall set the EPS update status to EU3 ROAMING NOT ALLOWED (and shall store it according to subclause 5.1.3.3) and shall delete any GUTI, last visited registered TAI, TAI list and eKSI. The UE shall delete the list of equivalent PLMNs and reset the attach attempt counter.

In S1 mode, the UE shall store the current TAI in the list of "forbidden tracking areas for roaming". If the ATTACH REJECT message is not integrity protected, the UE shall memorize the current TAI was stored in the list of "forbidden tracking areas for roaming" for non-integrity protected NAS reject message. Additionally, the UE shall enter the state EMM-DEREGISTERED. LIMITED-SERVICE or optionally EMM-DEREGISTERED.PLMN-SEARCH. If the UE is registered in N1 mode and operating in dual-registration mode, the PLMN that the UE chooses to register in is specified in 3GPP TS 24.501 subclause 4.8.3. Otherwise, the UE shall perform a PLMN selection according to 3GPP TS 23.122."

Therefore, one can see that reception of #13 in 5GS will also lead to deletion of EPS parameters. The problem is that when this cause is used by the network because no allowed NSSAI can be provided to the UE, then the EPS parameters will be affected negatively although EPS does not actually support slicing. This then further prevents the UE from using EPS even though the problems related to slicing do not even apply. For example, the UE will not be able to receive service from EPS since the last TAI in EPS will be considered to be forbidden, which means that UE cannot access EPS from that TAI, again even if slicing is not supported in EPS. Therefore, the current behaviour will negatively impact UE experience in EPS for a reason that is not supported or related to EPS features i.e., slicing.

It should also be noted that these cause codes do not apply to non-3GPP access although slicing applies to both 3GPP and non-3GPP accesses in 5GS. As such, a different cause code should be used in this case.

A summary of the prior art position is given in FIG. 1. If the URSP rules require that a new PDU session needs to be established, then the URSP rules will also indicate if the UE should also provide a slice identity (S-NSSAI) and/or a DNN for the new PDU session. These are the possible outcomes of the URSP rule: i) provide an S-NSSAI and a DNN, provide an S-NSSAI only but no DNN, provide a DNN only but no S-NSSAI, do not provide an S-NSSAI and do not provide a DNN.

In embodiments of the application, optimal use is made of URSP rules to avoid or at least reduce unnecessary signaling.

In a first embodiment, UE behaviour is modified so as to match an application to an existing PDU session. In this solution, it is assumed that the UE has only one S-NSSAI in the allowed NSSAI.

If the UE has only one S-NSSAI in the allowed NSSAI, and if the upper layers in the UE (e.g., an application) requests to use a PDU session, where optionally this request is from the upper layers (e.g., the applications) to the 5GSM entity in the UE, then the UE (e.g., the 5GSM entity in the UE) checks whether at least one certain condition is met.

For example, a condition may be any combination of the following after verifying the URSP rules (e.g., after the result of verifying the application information versus the URSP rules in the UE is any combination of the following):

The S-NSSAI is not determined or is not known or is not available i.e., the outcome of verifying the URSP rules (e.g., after verifying the application information against the URSP rules in the UE or local configuration in the UE) is such that an S-NSSAI component is not available. For example, this may be the case when the application information is determined to have a match against the default URSP rule which does not have an S-NSSAI in the matching RSD.

The DNN that is determined e.g., after verifying the URSP rules (or after verifying local UE configuration) is the same DNN as the DNN of an existing PDU session.

Optionally all other components, or a subset of the other components, for example the SSC mode, the IP version (in case of a request for an IP connection), the preferred access type, multi-access preference, or any other combination of parameters or components, etc, are the same as the components (or parameters or attributes) of an existing PDU session. For example, the SSC mode is the same as the SSC mode of any of the existing PDU session, etc.

If at least one condition is met, where the condition may be any combination of the above, and optionally if the UE has only one S-NSSAI in the allowed NSSAI, then the UE modifies its behaviour such that the UE does not send a new PDU Session Establishment Request with no S-NSSAI (and optionally with other attributes as determined based on the URSP verification or based on verification of UE local configuration).

Instead, the UE determines that the application in question, for which the above condition is verified or for which the above determination is made, can be associated with an existing PDU session. For example, the existing PDU session that is chosen, or selected, to be the PDU session which is associated with the new request may be any PDU session for which there is a match between the other attributes (or other application information) with the attributes (or RSD components) of an existing PDU session. These attributes can be any combination of the following: the DNN, the preferred access type, the SSC mode, the PDU session type (i.e., whether the session is for IPv4, IPv6, or Ethernet, or Unstructured, etc).

The UE (e.g., the 5GSM entity) forwards the attributes of the chosen PDU session to the upper layers (e.g., to the application layer).

Figure 2:
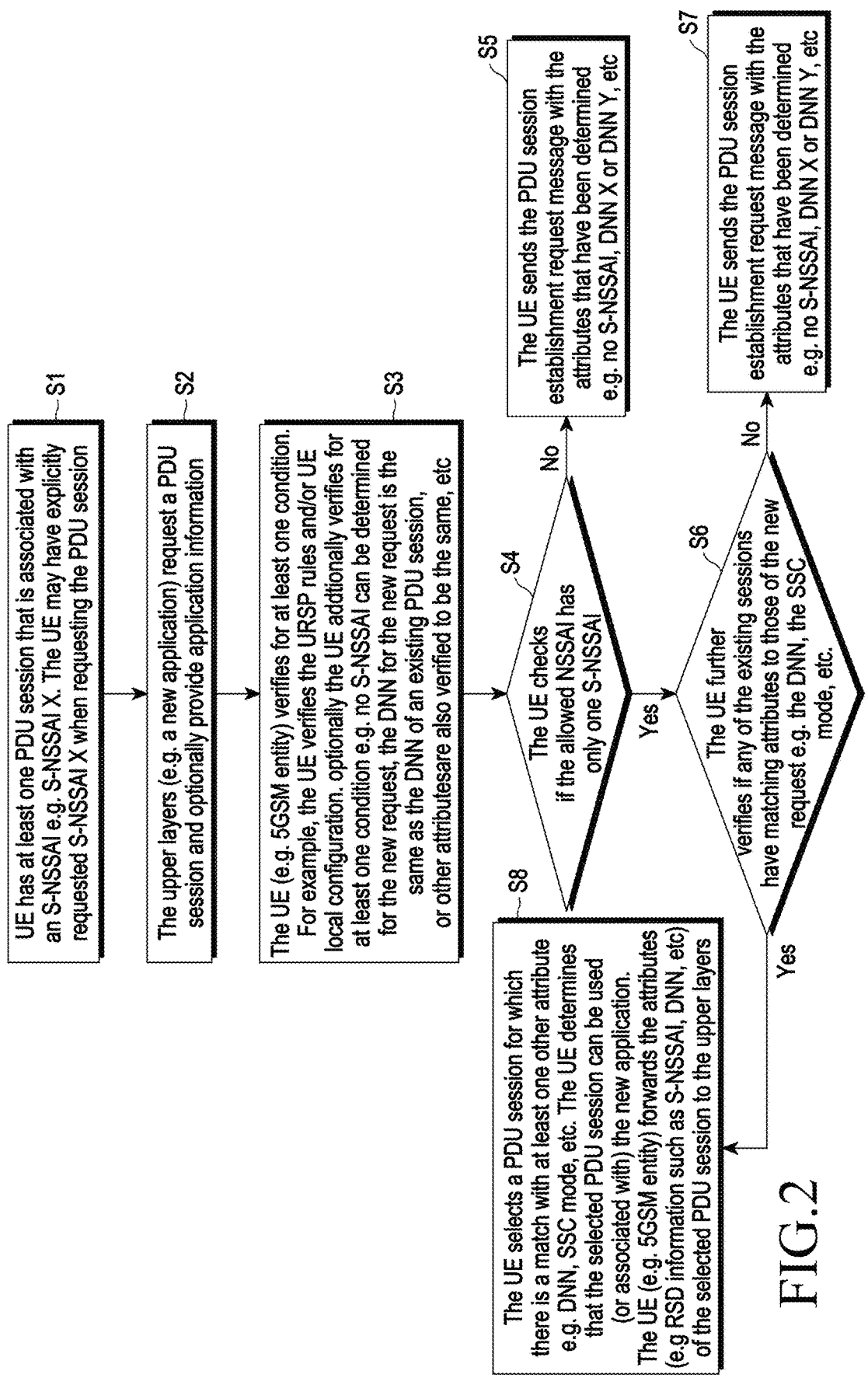
FIG. 2 shows a more detailed flowchart illustrating an embodiment of the present application.

FIG. 2 describes the proposed solution. This shows, in an overview manner, the broad operation of embodiments of the application. Essentially, the UE assesses on the basis of e.g., USRP rules in the UE, whether a new Application (App #2) which requests a PDU session is able to use an existing session, as used by App #1 (Option B) or if a new PDU session is required (Option A). The assessment is based on slice, DNN or other parameters. In contrast to the prior art, the assessment takes into account there being only one S-NSSAI in the allows NSSAI.

In accordance with the method shown in FIG. 2, the specification TS 24.526 V17.1.0 can be amended as follows:
"If the UE finds the traffic descriptor in a non-default URSP rule matching the application information, and:
I) if there is one or more PDU sessions:
1) matching at least one of the route selection descriptors of the URSP rule except the preferred access type and the multi-access preference, if any, wherein a route selection descriptor with PDU session type IPv4v6 matches also with PDU session type IPv4 if the network has sent 5GSM cause value #50 "PDU session type IPv4 only allowed" in the PDU SESSION ESTABLISHMENT ACCEPT message, and a route selection descriptor with PDU session type IPv4v6 matches also with PDU session type IPv6 if the network has sent 5GSM cause value #51 "PDU session type IPv6 only allowed" in the PDU SESSION ESTABLISHMENT ACCEPT message; and
2) established without requesting any parameter for which the matching route selection descriptor of the URSP rule does not provide a route selection descriptor component, except:
i) the preferred access type;
ii) the multi-access preference;
iii) the DNN, if one or more DNNs are included in the traffic descriptor, and the DNN provided by the application is the same as the DNN requested by the UE during the PDU session establishment; and
iv) the S-NSSAI, if the UE has only one S-NSSAI in the allowed NSSAI (and optionally the matching URSP rule and/or matching route selection descriptor does not provide an S-NSSAI)
the UE shall provide information on the PDU session that matches the route selection descriptor of the lowest precedence value to the upper layers;"

Note that, above, paragraph 2) iv) has been added to the prior art specification TS 24.526 V17.1.0.

In a second embodiment, the AMF does not forward the subsequent PDU session establishment request from the UE. This embodiment applies to the case when the UE has only one S-NSSAI in the allowed NSSAI but it is not limited to this case only. As such it can apply to any situation regardless of the number of entries in the allowed NSSAI for a UE.

It is assumed that the UE has a PDU session, say for an S-NSSAI X, and optionally for a DNN A. Assume further that the PDU session that is associated with S-NSSAI X was established wherein the UE had explicitly requested or included S-NSSAI X along with the PDU Session Establishment Request message which was sent in the UL NAS TRANSPORT message. Note that the use of "S-NSSAI X" is just an example to refer to any value of an S-NSSAI and the solution is not limited to an actual value "X" for an S-NSSAI.

When the AMF receives an UL NAS TRANSPORT with the payload type indicating "N1 SM information" and the request type indicating "initial request" but the request type is not present, the AMF determines an S-NSSAI for the request. If the S-NSSAI that is determined (or that is selected) by the AMF is the default S-NSSAI which is also the S-NSSAI of an existing PDU session and, optionally, if all other attributes of the new request are the same as an existing PDU session (e.g., DNN, SSC mode, PDU session type, access technology over which the new request is sent is the same as the access technology of the existing PDU session for which other attributes are the same, etc), then the AMF does not forward the request to the SMF. Instead, the AMF sends back the 5GSM request to the UE in a DL NAS TRANSPORT message and includes a 5GMM cause value. The 5GMM cause value may be a new value or may be an existing cause value such as, but not limited to, #62 (No network slices available) or #90 (Payload was not forwarded), or any other existing cause.

Following the reception of the cause value at the UE, e.g., after receiving #62 as set out above, then the 5GMM layer in the UE provides the 5GSM message (that was not forwarded by the AMF, or that was sent back to the UE) to the 5GSM entity and also forwards the received cause value. The UE may, based on the received cause value, determine that sending the request with no slice is not allowed and therefore may determine to associate the application, which initially triggered the new PDU session establishment request, to any existing PDU session as set out earlier in connection with the first embodiment.

In a third embodiment, the AMF informs the UE whether an S-NSSAI is a default slice/S-NSSAI. This embodiment applies to any use case and any feature and as such is not limited to the problem statement that was described earlier and hence can apply to any case.

This embodiment provides that the AMF indicates to a UE which S-NSSAI is a default S-NSSAI. This indication may be sent in any NAS message such as, but not limited to, the Registration Accept message, the Configuration Update Command message, or any other new or existing NAS message. The indication may be sent in a new IE that can be defined for this purpose where the IE may also include the S-NSSAI and an indication if the S-NSSAI is a default S-NSSAI, or the indication may be a new IE that is dedicated to contained the slices that are only default slices, or a new IE dedicated to include non-default slices based on which the UE can then deduce that the remaining (mutually exclusive) slices in the allowed NSSAI would be default slices.

Note that the SMF may also provide this indication to the UE as part of a 5GSM message such as the PDU Session Establishment Accept message.

When the UE is informed about which S-NSSAI is a default slice, or when the UE determines which S-NSSAI is a default slice (e.g., based on comparing the contents of a new indication versus the contents of the allowed NSSAI), the UE stores the slices that are marked as default and update this information every time the allowed NSSAI is updated.

When the UE is informed about which S-NSSAI is a default slice, or when the UE determines which S-NSSAI is a default slice (e.g., based on comparing the contents of a new indication versus the contents of the allowed NSSAI), the UE uses this information for a subsequent decision about whether or not to establish new PDU sessions. For example, if the UE knows the S-NSSAI of an existing PDU session (which is the case since the S-NSSAI is sent to the UE in the PDU Session Establishment Accept message), then if the UE cannot identify a different S-NSSAI for a new application request (e.g., based on verifying URSP rules or local UE configuration), then the UE can decide to associate a new request from a new application to an existing PDU session when any one or more of the following occurs in any combination:

The S-NSSAI for the new request is not available (e.g., after finding a match with a URSP rule or after verifying UE local configuration).

The other attributes or application information match the attributes of an existing PDU session e.g., DNN, SSC mode, preferred access type, PDU session type, etc.

The UE has one, or more than one, S-NSSAI in the allowed NSSAI and knows that an existing PDU session is associated with a default slice (based on a received indication from the network as explained above).

The UE has an existing PDU session that is associated with at least one default slice, where the UE optionally knows that the S-NSSAI that is associated with the existing PDU session is a default slice (as described above).

When any one or more of the above conditions is satisfied, in any combination, the UE may then determine to not send a new PDU Session Establishment Request message with no S-NSSAI and instead determine to associate the new application (or match the new application) to an existing PDU session based on the above condition. This is because sending a new request will lead the AMF to selecting the default slice which is already in use with an existing PDU session.

Note that the above may not apply to PDU sessions with specific characteristics such as a PDU session for URLLC or an always-on PDU session.

In a third embodiment, steps are provided for not impacting EPS parameters due to slicing in 5GS. This embodiment provided a set of solutions that can be used for, but not limited to, the problems associated with impacting EPS parameters, although EPS does not support slicing.

If any of the 5GMM causes #12 (Tracking area not allowed), #13 (Roaming not allowed in this tracking area), #15 (No suitable cells in tracking area) is received over the 3GPP access and in any 5GS NAS reject messages e.g., Registration Reject, Service Reject, or in Deregistration Request which is sent by the network then, if the UE did not send the requested NSSAI in its initial NAS message e.g., the Registration Request, then the UE which supports S1 mode and is operating in single registration mode shall not handle or shall not update or impact, the: EMM parameters, EMM state, EPS update status, 4G-GUTI, last visited registered TAI, TAI list, eKSI and attach attempt counter (or tracking area update attempt counter, or service request attempt counter, etc) as specified in 3GPP TS 24.301, for the case when the EPS attach request procedure is rejected with the EMM cause with the same value or for the case when the EPS tracking area update procedure is rejected with the EMM cause with the same value.

In other words, if the UE did not send the requested NSSAI in the initial NAS message (e.g., Registration Request) then the UE that supports S1 mode and operates in single registration mode does not handle or update or modify the EMM parameters, EPP update status, EMM state, TAI list, etc, as listed above, when the 5GMM cause code is received in 5GS.

As an alternative way of stating it, the UE shall only handle, or shall only update or modify, the: EMM parameters, EMM state, EPS update status, 4G-GUTI, last visited registered TAI, TAI list, eKSI and attach attempt counter (or tracking area update attempt counter, or service request attempt counter, etc.) in the same manner (as if the same EMM cause is received in EPS) only if the UE sent the requested NSSAI in the initial NAS message that was rejected e.g., if the UE sent the requested NSSAI in the Registration Request or Service Request, etc.

Alternatively stating it, only if the UE sent the requested NSSAI in the initial NAS message (e.g., Registration Request) then the UE shall handle, or shall update or modify, the: EMM parameters, EMM state, EPS update status, 4G-GUTI, last visited registered TAI, TAI list, eKSI and attach attempt counter (or tracking area update attempt counter, or service request attempt counter, etc.) in the same manner (as if the same EMM cause is received in EPS).

Note that the details set out above apply to any cause code that is to be sent to the UE in the case when no allowed NSSAI can be determined for the UE. This would also apply even if the cause code #62 (No network slices available) is sent to the UE (or is received by the UE).

As referred to in relation to problems experienced in the prior art, the cause codes #12, #13, or #15 may not apply to the non-3GPP access. For example, cause #15 (No suitable cells in tracking area) would not apply to non-3GPP since there is no concept of cells in non-3GPP access. As such, a different solution is required for the non-3GPP access in order to reject the UE when no requested NSSAI was sent by the UE and no allowed NSSAI can be determined for the UE.

A new cause value is provided, where this cause value may be used preferably over both the 3GPP or the non-3GPP access, when the network cannot determine allowed NSSAI for the UE in the case that the UE did not send a requested NSSAI. For example, a new 5GMM cause value may be defined to indicate "no allowed NSSAI is available", or "no default slices available", or any other new value can be defined for this purpose. This cause value can be used by the AMF when no allowed NSSAI can be determined for the UE optionally when the UE did not send a requested NSSAI, or when the same set of requested NSSAI are requested more than once and the result does not change in the network (e.g., no allowed NSSAI can be determined for the UE). Reception of this new cause value in the UE leads to the following UE behaviour.

The UE refrain from sending a Registration Request with no requested NSSAI (or with the same requested NSSAI), over the access technology over which the cause code was received, until any of the following conditions, or other predetermined conditions, occur:

the UE is configured with a new set of slices that can be sent as requested NSSAI, or the UE is manually updated with the slices that can be sent as a requested NSSAI the UE's slices that can be requested have been updated the user manually selects the PLMN or indicates that slices are now available for the UE a certain time elapses, where the UE may start a timer after the 5GMM cause is received. The timer value can be predetermined or could be received from the network. Upon expiry of the timer, the UE can the send a Registration Request with or without a requested NSSAI. As such, the AMF may send this timer to the UE in any of the NAS reject messages. This timer can be sent with an existing cause code or a new cause code, where the timer helps to block the UE from sending a Registration Request with no requested NSSAI.

Note that the new cause value can be used to address any of the problems identified herein.

Alternatively, if any of these existing causes are used over the non-3GPP access, or even over the 3GPP access, then the UE behaves as follows.

If the UE did not send the requested NSSAI in the initial NAS message (e.g., Registration Request), then the reception of the 5GMM cause #12, #13, or #15 or #62 are interpreted to mean that no slices are available for the UE. The UE may take the actions defined in TS 24.501 V17.1.0 when the same cause code is received but may also determine to not impact (or not handle or not modify) the EMM parameters, EMM state, etc, as set out above. The UE locally stores an indication that a Registration Request message without a requested NSSAI may not be sent by the UE until any of the following occurs in any combination:

the UE is configured with a new set of slices that can be sent as requested NSSAI, or the UE is manually updates with the slices that can be sent as a requested NSSAI the UE's slices that can be requested have been updated the user manually selects the PLMN or indicates that slices are now available for the UE a certain time elapses, where the UE may start a timer after the 5GMM cause is received. The timer value can be predetermined or could be received from the network. Upon expiry of the timer, the UE can the send a Registration Request with or without a requested NSSAI. As such, the AMF may send this timer to the UE in any of the NAS reject messages. This timer can be sent with an existing cause code or a new cause code, where the timer helps to block the UE from sending a Registration Request with no requested NSSAI.

Otherwise, if the UE sent the requested NSSAI in the initial NAS message (e.g., Registration Request), then the UE behaves as already described in TS 24.501 V17.1.0 for the case when the 5GMM cause is received.

Alternatively, the network uses a different existing 5GMM cause that can be sent over the 3GPP access or the non-3GPP access such as #7 (5GS services not allowed). However, if this cause code is received and the UE did not send a requested NSSAI in the initial NAS message (e.g., Registration Request), then the UE may take a different action from what is set out in TS 24.501 V17.1.0 for the case when the same cause is received. For example, the UE may simply only refrain from sending another Registration Request message without a requested NSSAI until any of the following conditions occurs, or any other defined conditions occur:

the UE is configured with a new set of slices that can be sent as requested NSSAI, or the UE is manually updates with the slices that can be sent as a requested NSSAI the UE's slices that can be requested have been updated the user manually selects the PLMN or indicates that slices are now available for the UE a certain time elapses, where the UE may start a timer after the 5GMM cause is received. The timer value can be predetermined or could be received from the network. Upon expiry of the timer, the UE can the send a Registration Request with or without a requested NSSAI. As such, the AMF may send this timer to the UE in any of the NAS reject messages. This timer can be sent with an existing cause code or a new cause code, where the timer helps to block the UE from sending a Registration Request with no requested NSSAI.

Note that the timer that is referred to above, that can be sent to the AMF, may be a timer that is specific to indicating that sending a Registration Request without a requested NSSAI, or with the same contents in the requested NSSAI, should not be done for the duration of the indicated timer value.

Note that in the above, the "requested NSSAI" may refer to the Requested NSSAI IE or the Requested mapped NSSAI IE, or both of these IEs. Note also that all of the embodiments herein apply to the 3GPP access or non-3GPP access, in any order and in any combination.

Figure 3:
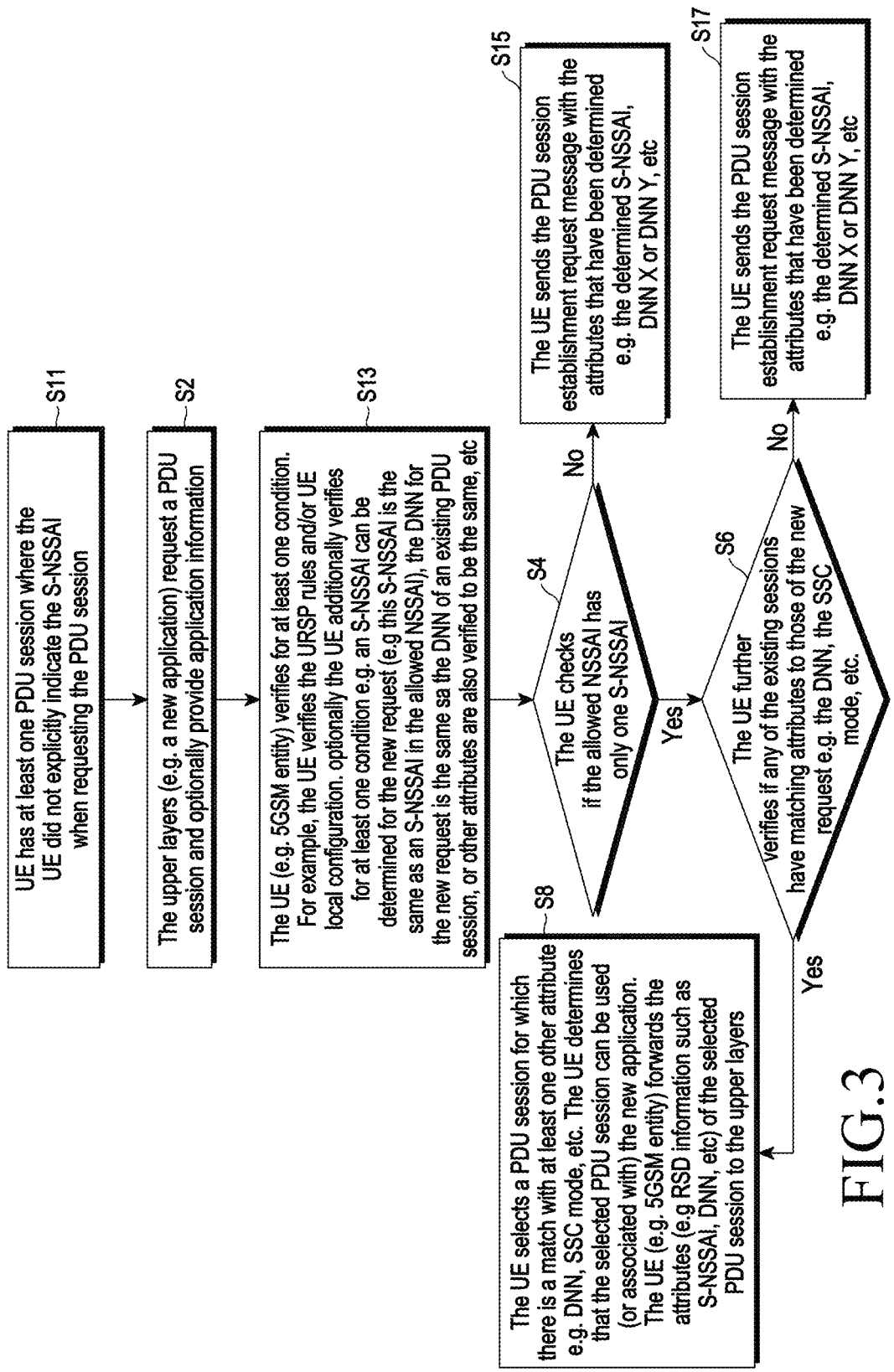
FIG. 3 shows a more detailed flowchart illustrating another embodiment of the present application.

In a further embodiment, illustrated in FIG. 3, the initial step S11 replaces S1 as shown in FIG. 2, and step S13 replaces step S3. Steps S15 and S17, replacing steps S5 and S7 respectively, are altered to take account of the different starting point.

In step S11, there is a different starting point. Here, the UE has at least one PDU session ongoing where the UE did not explicitly indicate the S-NSSAI when requesting the PDU session.

In step S13, where the UE additionally verifies if an S-NSSAI can be determined for the new request e.g., this S-NSSAI is the same as the S-NSSAI in the allowed NSSAI.

At steps S15 and S17, rather than one of the attributes being determined to be "no-S-NSSAI", this is replaced with "the determined S-NSSAI" to reflect the different starting condition where the UE did not explicitly indicate the S-NSSAI when requesting the PDU session.

Apart from this change in starting conditions at S11, the changed assessment at step S13, and the different actions at S15 and S17, the remaining steps are the same and so the description of these steps is omitted for brevity.

Figure 4:
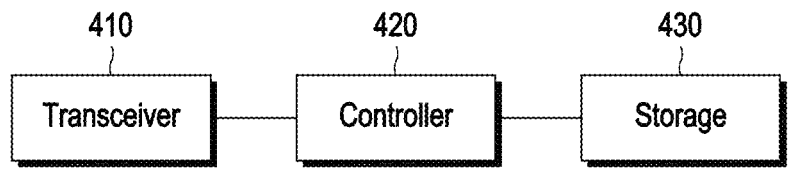
FIG. 4 illustrates a block diagram of a UE according to an embodiment of the disclosure.

FIG. 4 illustrates a block diagram of a UE according to an embodiment of the disclosure.

Referring to FIG. 4, the UE may include a transceiver 410, a controller 420, and storage 430. In the present disclosure, the controller 420 may include a circuit, an ASIC, or at least one processor.

The transceiver 410 may transmit and receive signals to and from a base station or another network entity.

The controller 420 may control the overall operation of the network entity according to an embodiment. For example, the controller 420 may control the signal flow to perform the operations in FIGS. 1-3 described above.

The storage 430 may store at least one of information exchanged through the transceiver 410 and information generated by the controller 430.

Figure 5:
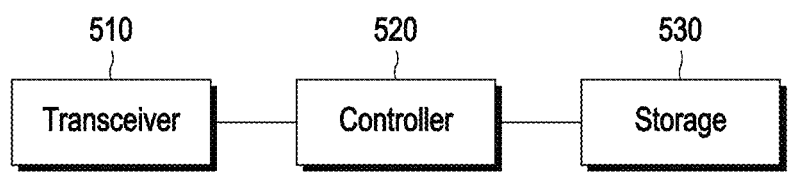
FIG. 5 illustrates a block diagram of a base station according to an embodiment of the disclosure.

FIG. 5 illustrates a block diagram of a base station according to an embodiment of the disclosure.

Referring to FIG. 5, the base station may include a transceiver 510, a controller 520, and storage 530. In the present disclosure, the controller 520 may include a circuit, an ASIC, or at least one processor.

The transceiver 510 may transmit and receive signals to and from a terminal (UE) or another network entity.

The controller 520 may control the overall operation of the network entity according to an embodiment. For example, the controller 520 may control the signal flow to perform the operations in FIGS. 1-3 described above.

The storage 530 may store at least one of information exchanged through the transceiver 610 and information generated by the controller 530.

Figure 6:
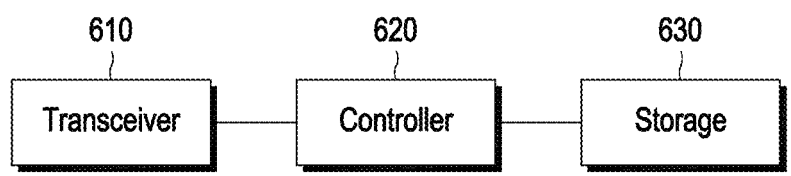
FIG. 6 illustrates a block diagram of a network entity according to an embodiment of the disclosure.

FIG. 6 illustrates a block diagram of a network entity according to an embodiment of the disclosure. The network entity (function) may correspond to one of the network entities shown in FIGS. 1-3. For example, the network entity may refer to one of the network functions (e.g., AMF, SMF, etc.) shown in FIGS. 1-3.

Referring to FIG. 6, the network entity may include a transceiver 610, a controller 620, and storage 630. In the present disclosure, the controller 620 may include a circuit, an ASIC, or at least one processor.

The transceiver 610 may transmit and receive signals to and from a terminal (UE) or another network entity.

The controller 620 may control the overall operation of the network entity according to an embodiment. For example, the controller 620 may control the signal flow to perform the operations in FIGS. 1-3 described above.

The storage 630 may store at least one of information exchanged through the transceiver 610 and information generated by the controller 630.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The application is not restricted to the details of the foregoing embodiment(s). The application extends to any novel one, or any novel combination, of the features disclosed in this specification (including any accompanying claims, abstract and drawings), or to any novel one, or any novel combination, of the steps of any method or process so disclosed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE), the method comprising:
    identifying at least one protocol data unit (PDU) session;
    identifying that at least one of route selection descriptor (RSD) of UE route selection policy (URSP) rule for the UE matches with the at least one PDU session;
    identifying whether allowed network slice selection assistance information (allowed NSSAI) for the UE includes only one single network slice selection assistance information (S-NSSAI); and
    providing, to an upper layer, information on a PDU session among the at least one PDU session based on the allowed NSSAI for the UE including only one S-NSSAI, and the PDU session matching an RSD of a lowest precedence value.

2. The method of claim 1, further comprising:
    identifying the at least one PDU session is established without requesting any parameter for which a matching RSD of the URSP rule does not provide an RSD component except S-NSSAI.

3. The method of claim 1, further comprising:
    sending a PDU establishment request message with an attribute that has been determined in case that the allowed NSSAI for the UE does not include only one S-NSSAI, wherein the attribute that has been determined relates to the S-NSSAI or a data network name (DNN).

4. The method of claim 1, further comprising:
    requesting, from an upper layer, a new PDU session includes application information.

5. The method of claim 1,
    wherein the S-NSSAI is not known or not available;
    wherein a data network name (DNN) is the same DNN as one of the at least one PDU sessions; and
    wherein at least one of session and service continuity (SSC) mode, internet protocol (IP) version, preferred access type, and multi-access preference is the same as one of the at least one PDU sessions.

6. The method of claim 1, further comprising:
for the at least one PDU session, not explicitly indicating S-NSSAI when requesting the at least one PDU session.

7. A user equipment (UE) comprising:
a transceiver; and
a processor operably coupled to the transceiver, the processor configured to:
- identify at least one protocol data unit (PDU) session;
- identify that at least one of route selection descriptor (RSD) of UE route selection policy (URSP) rule for the UE matches with the at least one PDU session; identify whether allowed network slice selection assistance information (allowed NSSAI) for the UE includes only one single network slice selection assistance information (S-NSSAI); and
- provide, to an upper layer, information on a PDU session among the at least one PDU session based on the allowed NSSAI for the UE including only one S-NSSAI, and the PDU session matching an RSD of a lowest precedence value.

8. The UE of claim 7, wherein the processor is further configured to identify the at least one PDU session is established without requesting any parameter for which a matching RSD of the URSP rule does not provide an RSD component except S-NSSAI.

9. The UE of claim 8, wherein the processor is further configured to send a PDU establishment request message with an attribute that has been determined in case that the allowed NSSAI for the UE does not include only one S-NSSAI, wherein the attribute that has been determined relates to the S-NSSAI or a data network name (DNN).

10. The UE of claim 7, wherein the processor is further configured to request, from the upper layer, a new PDU session including application information.

11. The UE of claim 7,
wherein the S-NSSAI is not known or not available;
wherein a data network name (DNN) is the same DNN as one of the at least one PDU sessions; and
wherein at least one of session and service continuity (SSC) mode, internet protocol (IP) version, preferred access type, and multi-access preference is the same as one of the at least one PDU sessions.

12. The UE of claim 7, wherein the processor is further configured, for the at least one PDU session, to not explicitly indicate S-NSSAI when requesting the at least one PDU session.

* * * * *